United States Patent
Zhou

(10) Patent No.: US 8,835,078 B2
(45) Date of Patent: Sep. 16, 2014

(54) PROTON SELECTIVE MEMBRANE FOR SOLID POLYMER FUEL CELLS

(76) Inventor: Yanxiu Zhou, Phoenix, AZ (US)

( * ) Notice: Subject to any disclaimer, the term of this patent is extended or adjusted under 35 U.S.C. 154(b) by 303 days.

(21) Appl. No.: 12/704,392

(22) Filed: Feb. 11, 2010

(65) Prior Publication Data

US 2010/0203422 A1 Aug. 12, 2010

Related U.S. Application Data

(60) Provisional application No. 61/207,367, filed on Feb. 11, 2009, provisional application No. 61/209,652, filed on Mar. 9, 2009.

(51) Int. Cl.
*H01M 8/10* (2006.01)
*C08J 5/22* (2006.01)

(52) U.S. Cl.
CPC ............. *C08J 5/2237* (2013.01); *C08J 2333/26* (2013.01); *H01M 8/1023* (2013.01); *H01M 8/1076* (2013.01); *H01M 8/1072* (2013.01); *C08J 2333/02* (2013.01); *C08J 2339/08* (2013.01); *Y02E 60/521* (2013.01)
USPC ............................ 429/491; 429/492; 429/483

(58) Field of Classification Search
USPC ......................................... 429/492, 483, 491
See application file for complete search history.

(56) References Cited

U.S. PATENT DOCUMENTS

| | | | |
|---|---|---|---|
| 7,393,909 | B2 | 7/2008 | Sellergren et al. |
| 2004/0058380 | A1 | 3/2004 | Levon et al. |
| 2005/0159570 | A1* | 7/2005 | Sellergren et al. ............ 526/258 |
| 2005/0215762 | A1* | 9/2005 | Ramakrishnan et al. ...... 528/480 |
| 2007/0134721 | A1* | 6/2007 | Laitenberger et al. ......... 435/7.1 |
| 2007/0166590 | A1* | 7/2007 | Nakano et al. .................. 429/33 |
| 2008/0179191 | A1 | 7/2008 | Zhou et al. |
| 2009/0087549 | A1 | 4/2009 | Zhou et al. |

FOREIGN PATENT DOCUMENTS

WO 2005/059507 A2 6/2005

OTHER PUBLICATIONS

Yanxiu Zhou et al., Potentiometric Sensing of Chemical Warfare Agents: Surface Imprinted Polymer Integrated with an Indium Tin Oxide Electrode, Anal. Chem. 2004, 76, 2689-2693.
Yanxiu Zhou et al., Potentiometric Sensing of Chiral Amino Acids, Chem. Mater. 2003, 15, 2774-2779.
Yanxiu Zhou et al., Potentiometric sensor for dipicolinic acid, Biosensors and Bioelectronics 20 (2005) 1851-1855.
Yantian Wang et al., A potentiometric protein sensor built with surface molecular imprinting method, Biosensors and Bioelectronics 24 (2008) 162-166.
Steven C. Zimmerman et al., Synthetic hosts via molecular imprinting—are universal synthetic antibodies realistically possible?, Chem. Commun. 2004, 5-14.

(Continued)

*Primary Examiner* — Jane Rhee
(74) *Attorney, Agent, or Firm* — Zeman-Mullen & Ford, LLP

(57) ABSTRACT

A proton selective membrane for solid polymer electrolyte fuel cells that is produced by providing one or more template molecules, providing one or more functional monomers to interact with the template molecules, providing a cross-linking agent(s) to covalently bond polymer chains created with the template molecules and functional monomers by polymerization, providing an initiating agent to start a chemical reaction which results in an imprinted polymer, and removing the template molecules from the imprinted polymer to create a proton selective membrane.

5 Claims, 10 Drawing Sheets

(56) References Cited

OTHER PUBLICATIONS

John Anderson, et al., Steady-State and Frequency-Domain Lifetime Measurements of an Activated Molecular Imprinted Polymer Imprinted Dipicolinic Acid, Journal of Fluorescence, vol. 14, No. 3, May 2004.

Yun-Mei, et al., Synthesis and Evaluation of Molecularly Imprinted Polymers Using Acetylsalicylic Acid as Template, Journal of Instrumental Analysis, vol. 26, No. 2, 165-169.

Claudio Baggiani, Adsorption isotherms of a molecular imprinted polymer prepared in the presence of a polymerisable template Indirect evidence of the formation of template clusters in the binding site, Analytica Chimica Acta 504 (2004) 43-52.

Roongnapa Suedee, et al., Development of trichloroacetic acid sensor based on molecularly imprinted polymer membrane for the screening of complex mixture of haloacetic acids in drinking water, Analytica Chimica Acta 504 (2004) 89-100.

C. Baggiani, et al., Binding properties of 2,4,5-trichlorophenoxyacetic acid-imprinted polymers prepared with different molar ratios between template and functional monomer, Talanta 62 (2004) 1029-1034.

Hye-Ryoung Park, et al., Separation of Hydroxybenzoic Acid Isomers Using the Molecular Imprinting Technique, Journal of Applied Polymer Science, vol. 105, 2824-2829 (2007).

Huiting Zhang, et al., Retention behavior of phenoxyacetic herbicides on a molecularly imprinted polymer with phenoxyacetic acid as a dummy template molecule, Bioorganic & Medicinal Chemistry 15 (2007) 6089-6095.

Koji Nemoto, et al., Simple and Effective 3D Recognition of Domoic Acid Using a Molecularly Imprinted Polymer, J. Am. Chem. Soc. 2007, 129, 13626-13632.

Karsten Haupt, et al., Assay System for the Herbicide 2,4-Dichlorophenoxyacetic Acid Using a Molecularly Imprinted Polymer as an Artificial Recognition Element, Anal. Chem. 1998, 70, 628-631.

C. Baggiani, et al., Chromatographic characterization of molecularly imprinted polymers binding the herbicide 2,4,5-trichlorophenoxyacetic acid, Journal of Chromatography A, 883 (2000) 119-126.

Claudio Baggiani, et al., Molecularly imprinted solid-phase extraction sorbent for the clean-up of chlorinated phenoxyacids from aqueous samples, Journal of Chromatography A, 938 (2001) 35-44.

Hui Li, et al., Separation and purification of chlorogenic acid by molecularly imprinted polymer monolithic stationary phase, Journal of Chromatography A, 1098 (2005) 66-74.

K.P. Prathish, et al., Molecularly imprinted polymer-based potentiometric sensor for degradation product of chemical warfare agents Part I. Methylphosphonic acid, Talanta 71 (2007) 1976-1980.

Yu Ping Zhang, et al., Novel preparation of monolithic imprinted columns for electrochomatographic separation by photopolymerization, Chinese Chemical Letters 18 (2007) 734-737.

Yongjian Wang, et al., Specific binding of cholic acid by cross-linked polymers prepared by the hybrid imprinting method, Polymer 48 (2007) 5565-5571.

Hsin-Hung Pan, et al., Synthesis of Molecularly Imprinted Polymer and its Molecular Recognition Properties of N-Acetylneuraminic Acid, E-Journal of Chemistry, vol. 4, No. 4, pp. 611-619, Oct. 2007.

Yun-Mei, et al., Synthesis and Evaluation of Molecularly Imprinted Polymers Using Acetylsalicylic Acid as a Template, Journal of Instrumental Analysis, vol. 26, No. 2, 165-169.

* cited by examiner

PROTON SELECTIVE MEMBRANE FOR SOLID POLYMER FUEL CELLS

CROSS-REFERENCE TO RELATED APPLICATIONS

This application claims the benefit of U.S. Provisional Application No. 61/209,652, filed Mar. 9, 2009, and U.S. Provisional Application No. 61/207,367, filed Feb. 11, 2009, which are both herein incorporated by reference in their entireties.

FIELD OF THE INVENTION

The present invention relates to a proton selective membrane and, more particularly, to a solid polymer electrolyte membrane for fuel cells that selectively allows only protons to pass through it. The solid polymer electrolyte membrane can be used in solid polymer electrolyte fuel cells (SPEFCs), which are also known as proton exchange membrane fuel cells (PEMFCs), ion exchange membrane fuel cells (IEMFCs), or polymer electrolyte membrane fuel cells. The proton selective membrane is produced by providing one or more template molecules, providing one or more functional monomers to interact with the template molecules, providing an initiating agent to start a chemical reaction which results in an imprinted polymer, providing at least one cross-linking agent to covalently bond polymer chains created with the template molecules and functional monomers by polymerization, and removing the template molecules from the imprinted polymer to create a proton selective membrane.

BACKGROUND OF THE INVENTION

Eighty percent of the world energy demand is currently being met by fossil fuels. However, two major problems exist with the continued use of fossil fuels. First, fossil fuels are not available in unlimited quantities and will eventually be depleted. Second, fossil fuels cause serious environmental problems such as climate changes, melting of icecaps, global warming, acid rain, rising sea levels, pollution, oil spills, and ozone layer depletion, to name a few. In order to reduce dependence on fossil fuels and decrease the pollution created by fossil fuels, alternative solutions have been developed such as the creation of fuel cells.

Fuel cells have the potential to become an important energy conversion technology. Several types of fuel cells exist such as, for example, solid polymer electrolyte fuel cells, phosphoric acid fuel cells, alkaline fuel cells, molten carbonate fuel cells, and solid oxide fuel cells. The solid polymer electrolyte fuel cells are being developed for transport applications as well as for stationary fuel cell applications and portable fuel cell applications. The key features of this type of fuel cell include lower temperature/pressure ranges and a polymer electrolyte membrane. The solid polymer electrolyte fuel cells employ a solid polymer electrolyte to separate the fuel from the oxidant. The chemical energy liberated during the electrochemical reaction of hydrogen and oxygen is transformed to electrical energy. Desired characteristics for polymer membrane electrolyte materials used for SPEFCs include 1) high proton conductivity, 2) low electronic conductivity, 3) low permeability to fuel and oxidant, 4) low water transport through diffusion and electro-osmosis, 5) oxidative and hydrolytic stability, 6) good mechanical properties in both the dry and hydrated states, 7) low cost, and 8) capability for fabrication into membrane electrode assemblies (MEAs).

In SPEFCs, the so-called proton-conducting (exchange) membranes normally use carbon-fluorine backbone chains with perfluoro side chains containing sulfonic acid groups, such as Nafion, the first of a class of synthetic polymers with ionic properties discovered by DuPont, or other perfluorinated electrolyte membranes, such as Flemion™ from Asashi Glass Co., Ltd (Japan). Currently, almost all of the existing membrane materials for SPEFCs depend on absorbed water and its interaction with acid groups to produce protonic conductivity. Water management can be very difficult with SPEFCs because water in the membrane is attracted toward the cathode of the cell through polarization. Too much water will flood the membrane and too little water will dry the membrane and, in both cases, power output will drop. Therefore, water management is crucial to the performance of PEMFCs. In addition, the membrane is sensitive to things like metal ions, which can be introduced by corrosion of metallic bipolar plates, metallic components in the fuel cell system, or from contaminants in the fuel/oxidant. Both water transport and mechanical properties are key issues with existing SPEFCs. Accordingly, there is a need for a water independent membrane with high protonic conductivity for use as a solid electrolyte in solid polymer electrolyte fuel cells, such as proton selective membranes (PSMs).

SUMMARY OF THE INVENTION

In accordance with various aspects of the present invention, a proton selective membrane for functioning as an electrolyte in a SPEFC is provided as well as methods for making the proton selective membrane and the PSM based membrane electrode assembly (MEA). In accordance with one exemplary embodiment, the proton selective membrane for functioning as an electrolyte in a fuel cell is produced by a process of providing one or more template molecules, providing one or more functional monomers to interact with the template molecules, providing an initiating agent to start a chemical reaction which results in an imprinted polymer, providing at least one cross-linking agent to covalently bond polymer chains created with the template molecules and the functional monomers by polymerization, and removing the template molecules from the imprinted polymer to form the proton selective membrane. The template molecules may be selected from the group consisting of sulfuric acid, sulfonic acid, sulfonimide, sulfamide acid, phosphoric acid, phosphonic acid, phosphinic acid, carboxylic acid, or other proton conducting moieties.

An example of a proton selective membrane made in accordance with the exemplary embodiment described above may include any of the above listed proton conducting template molecules, vinylpyridine as the functional monomer, at least one of ethylene dimethacrylate (EDMA), trimethylol-propane trimethacrylate (TRIM), acrylamide and divinylbenzene (DVB) as a cross-linking agent, and at least one of 2,2-azobis-(2-methylpropionitrile) (AIBN), dibenzoyl peroxide (BPO), Irgacure 1800, 1,4-divinylbenzene (DVB), 2,2-dimethoxy-2-phenylacetophenone (DPP) and 2,2'-azobis(2,4-dimethyl-valeronitrile) (ADVN) as an initiating agent. Yet another example of a proton selective membrane made in accordance with the exemplary embodiment described above may include any of the above listed proton conducting template molecules, vinylpyridine, methacrylic acid, acrylic acid, acrylamide, or the combination of vinylpyridine and acrylamide as the functional monomers, at least one of ethylene dimethacrylate (EDMA), trimethylol-propane trimethacrylate (TRIM), acrylamide and divinylbenzene (DVB) as the cross-linking agent, and at least one of 2,2-azobis- (2-methylpropionitrile) (AIBN), dibenzoyl peroxide (BPO), Irgacure 1800, 1,4-divinylbenzene (DVB), 2,2-dimethoxy-2-phenylacetophenone (DPP) and 2,2'-azobis(2,4-dimethylvaleronitrile) (ADVN) as an initiating agent.

The present invention also includes a method for making a proton selective membrane for use as an electrolyte in a fuel cell which includes the steps of a) providing one or more template molecules, b) providing one or more functional monomers to interact with the template molecules, c) providing at least one cross-linking agent for covalently bonding polymer chains created with the template molecules and the functional monomers by polymerization, d) providing an initiating agent to start a chemical reaction which results in an imprinted polymer, and removing the template molecules from the imprinted polymer to form the proton selective membrane. This method for making a proton selective membrane in accordance with the present invention may include any of the molecules or agents listed above with respect to the examples set out in relation to the exemplary embodiment for a proton selective membrane for functioning as an electrolyte in a SPEFC.

Another exemplary embodiment of the method for making a proton selective membrane for functioning as an electrolyte in a fuel cell includes the steps of a) providing one or more molecules for use as molecule building blocks, a substrate, normally a electrode, having a surface capable of interacting with the molecule building blocks wherein the electrode comprises platinum catalyst particles supported on large carbon particles or other catalysts being used as electrodes in a fuel cell, and one or more proton conducting template molecules, b) providing one or more solvents to create a solvent solution, c) adding the molecule building blocks, the electrode, and the template molecules, in any order, to the solvent solution to create a matrix via the interaction between the building blocks and the surface of the electrodes, d) removing the electrodes containing the matrix from the solution, e) rinsing the electrode containing the matrix with one or more solvents or solutions to extract the template molecules and expose a proton selective membrane based MEA. The second exemplary embodiment of the method for making a proton selective membrane based MEA in a fuel cell may also include the step of pre-modifying or pre-treating the surface of the catalyst/electrode with one or more specific functional groups that interact with the molecule building blocks, and/or the step of providing at least one cross-linking agent to the solvent solution and/or the step of providing an initiating agent to the solvent solution.

Further aspects of the invention and areas or applicability will become apparent from the description provided herein. It should be understood that the description and specific examples are intended for purposes of illustration only and are not intended to limit the scope of the present invention.

BRIEF DESCRIPTION OF THE DRAWINGS

The drawings described herein are for illustration purposes only and are not intended to limit the scope of the present disclosure in any way. The present invention will become more fully understood from the detailed description and the accompanying drawings wherein.

DETAILED DESCRIPTION

Figure 1:
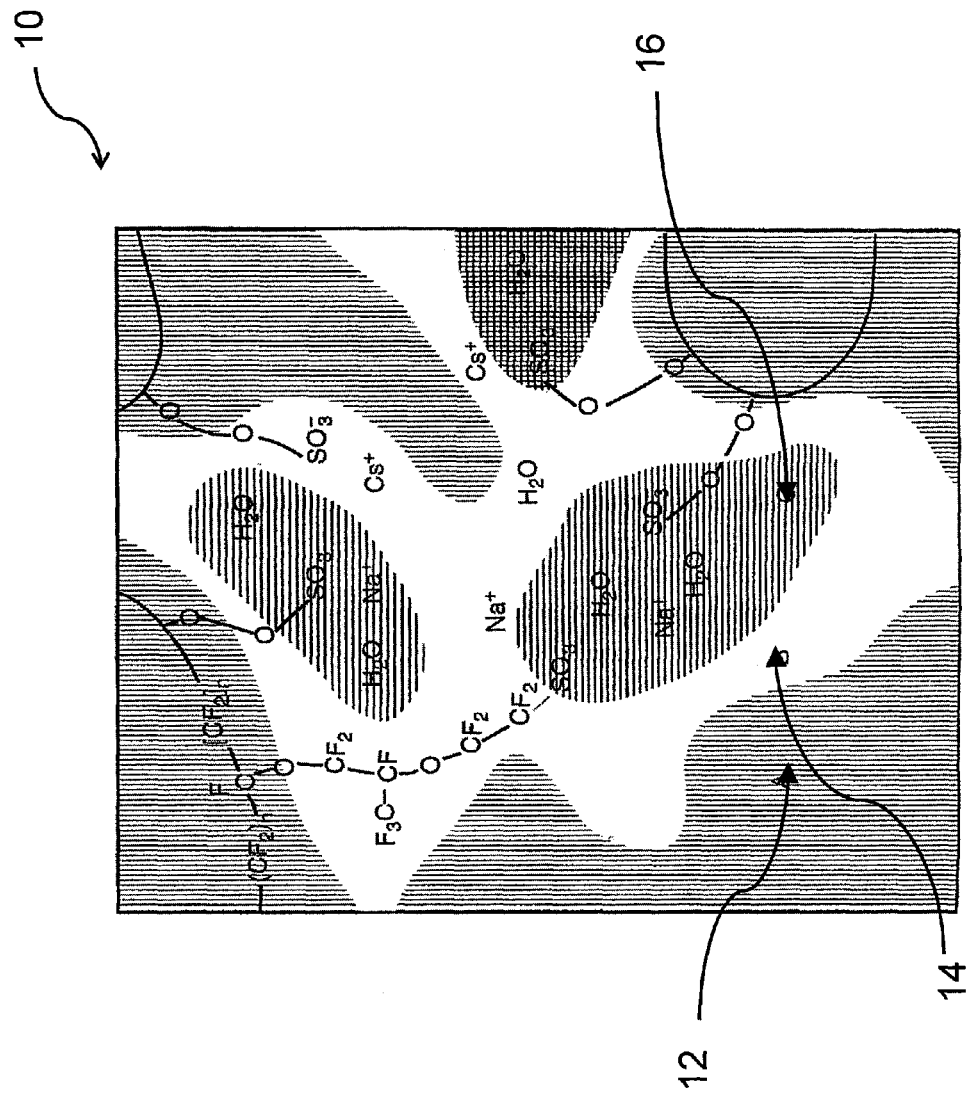
FIG. 1 is a diagram showing a prior art perfluorosulfonic acid (PFSA) membrane intended for PEM fuel cell application and its transport properties.

The following description is merely exemplary in nature and is not intended to limit the present invention or its teachings, applications, or uses thereof. It should be understood that throughout the drawings, corresponding reference numerals indicate like or corresponding parts and features. The description of specific examples indicated in various embodiments and aspects of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

The present invention may be described herein in terms of various functional components and processing steps. It should be appreciated that such components and steps may be realized by any number of molecules or components configured to perform the specified functions. For example, the present invention may employ template molecules such as sulfuric acid, sulfonic acid, sulfonimide, sulfamide acid, phosphoric acid, phosphonic acid, phosphinic acid, and carboxylic acid, and other types of proton conducting moieties as template molecules to interact with functional monomers such as 4-vinylpyridine, methacrylic acid, acrylic acid and acrylamide, or any combination of them.

FIG. 1 is a diagram showing a prior art proton exchange membrane 10, namely a perfluorosulfonic acid (PFSA) structure (e.g. Nafion) and its three-region structure model. PFSA includes region 12 which consists of fluorocarbon backbone materials, some of which are in a microcrystalline form. Region 16 comprises inverted micelle-like ion clusters and is where the majority of the polar groups exist, such as absorbed water, sulfonate exchange sites, and counterions. The interfacial region 14 is responsible for ionic conduction. A network of these ion clusters is considered to be interconnected by short and narrow channels in the fluorocarbon backbone network.

Figure 2:
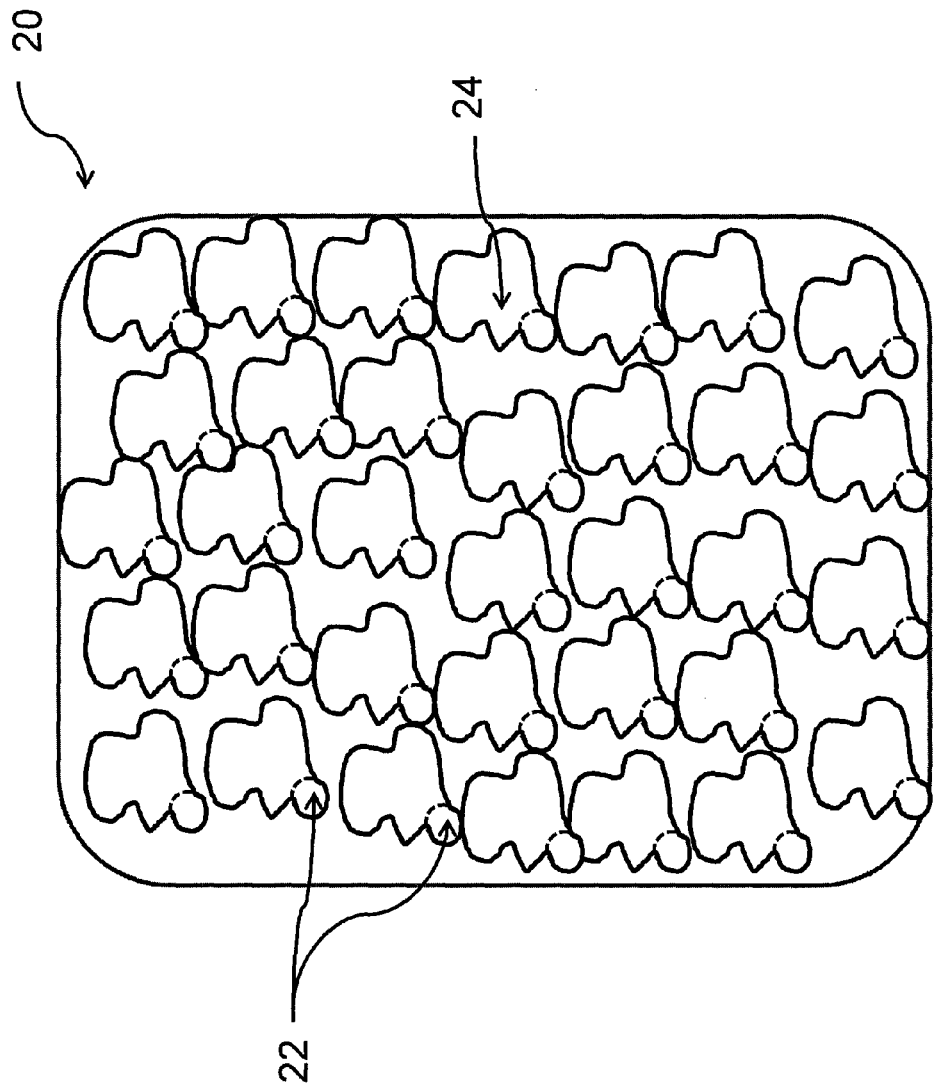
FIG. 2 is a diagram showing a proton selective membrane made in accordance with the present invention which can replace the proton exchange membrane shown in FIG. 1.

FIG. 2 is a diagram showing a proton selective membrane 20 made in accordance with the present invention which can replace the proton exchange membrane 10 shown in FIG. 1. The proton selective membrane of the present invention uses proton channels 22 with the template molecules 24 built within polymers or other materials to create proton flow capability. The proton channels within the template molecules can occupy up to 30%, or even more, of the polymers or other materials. In addition, the ionic conductivities of the proton selective membrane of the present invention are independent of water thereby solving the problems associated with water transport and mechanical properties that are seen in proton exchange membranes. Thermal stability is also improved with the proton selective membrane of the present invention since no water is required thereby increasing the ionic conductivities of the membranes. The conductivity of the proton selective membrane of the present invention does not depend on the ion-exchange between the protons generated from hydrogen and the anionic pendant side chains of perfluorinated vinyl ethers terminated by perfluorosulfonic acid groups as with Nafion and other proton exchange membranes. The proton selective membrane of the present invention abandons the concept of "ionic exchange" to develop protonic conducting membranes. The proton selective membrane of the present invention employs protonic channels or sites to transfer protons from one side of the membrane to the other side of the membrane. The ionic proton channels are built within the matrix of polymers or other materials as further described below in accordance with the methods of the present invention.

Figure 3:
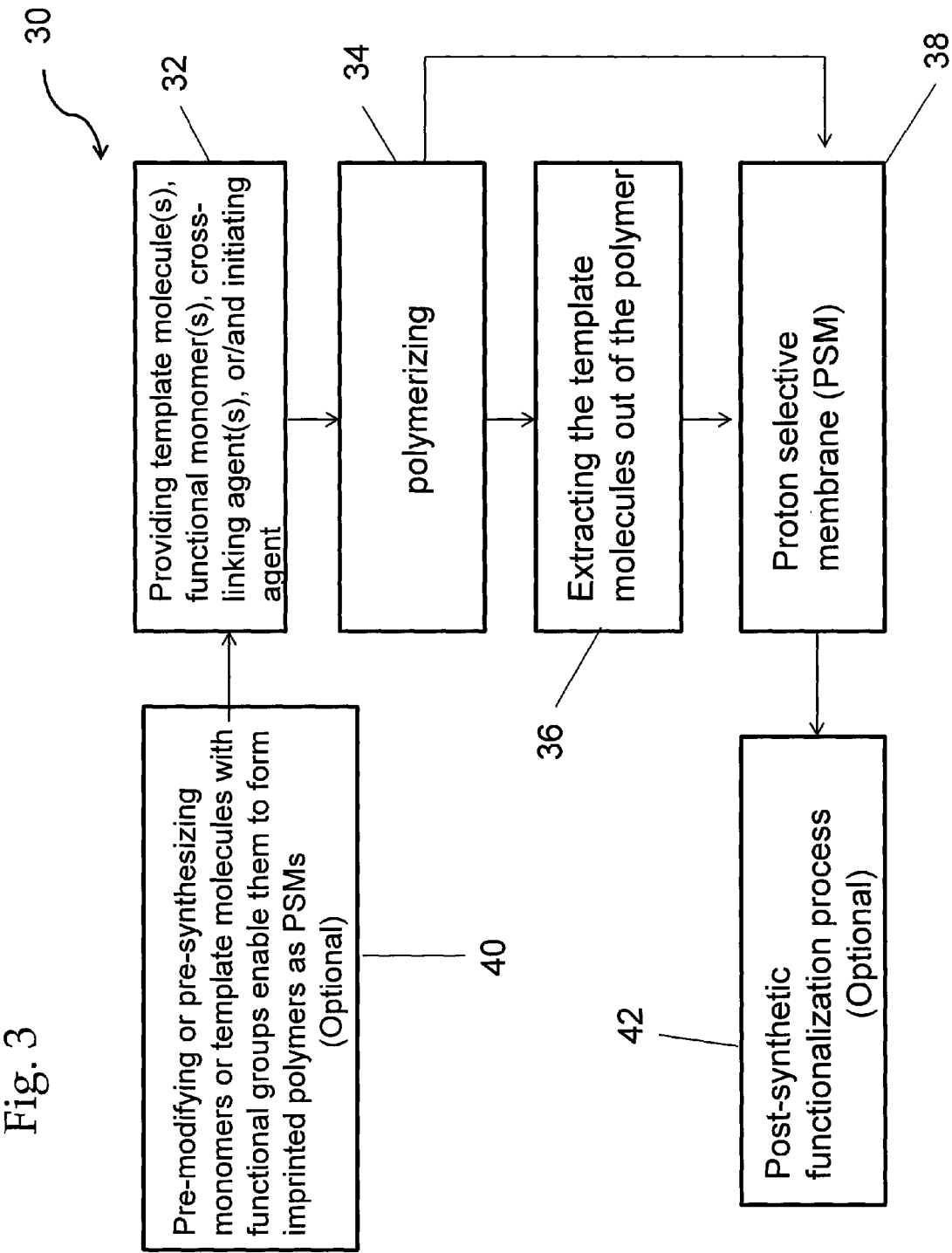
FIG. 3 is a flowchart showing a first exemplary embodiment for making the proton selective membrane of the present invention.

A flowchart showing a first exemplary embodiment for making the proton selective membrane of the present invention is shown in FIG. 3. The method 30 for making the proton selective membrane of the present invention includes first providing proton conducting moieties as template molecules, functional monomer(s), cross-linking agent(s), or/and initiating agent(s) in step 32. The proton conducting template molecules may include, but are not limited to, sulfuric acid, sulfonic acid, sulfonimide, sulfamide acid, phosphoric acid, phosphonic acid, phosphinic acid, and carboxylic acid. The functional monomers provided in step 32 may include, but are not limited to, 4-vinylpyridine, methacrylic acid, acrylic acid, acrylamide, and any combination thereof. Next, a cross-linking agent or agents are provided to covalently bond polymer chains created with the template molecules and the functional monomers by polymerization. The cross-linking agents may include, but are not limited to, ethylene dimethacrylate (EDMA), trimethylol-propane trimethacrylate (TRIM), acrylamide and divinylbenzene (DVB). An initiating agent is then provided in step 32 to start a chemical reaction which results in an imprinted polymer. The initiating agent may include, but is not limited to, 2,2-azobis-(2-methylpropionitrile) (AIBN), dibenzoyl peroxide (BPO), Irgacure 1800, 1,4-divinylbenzene (DVB), 2,2-dimethoxy-2-phenylacetophenone (DPP) and 2,2'-azobis(2,4-dimethyl-valeronitrile) (ADVN). Next, the polymerization process is carried out in step 34. The polymerization process may result in a proton selective membrane (step 38). Alternatively, the proton conducting template molecules may be removed from the imprinted polymer in step 36 to create a proton selective membrane (step 38).

The method for making the PSMs of the present invention shown in FIG. 3 may also further include the step of pre-modifying or pre-synthesizing the monomers or the template molecules with one or more specific functional groups that interact with each other, or improving proton conducting ability (step 40). In addition, the method shown in FIG. 3 may also further include the step of carrying out post-synthetic functionalization process to increase the affinity and/or selectivity of the PSMs for proton, and/or proton conducting ability (step 42).

Figure 4:
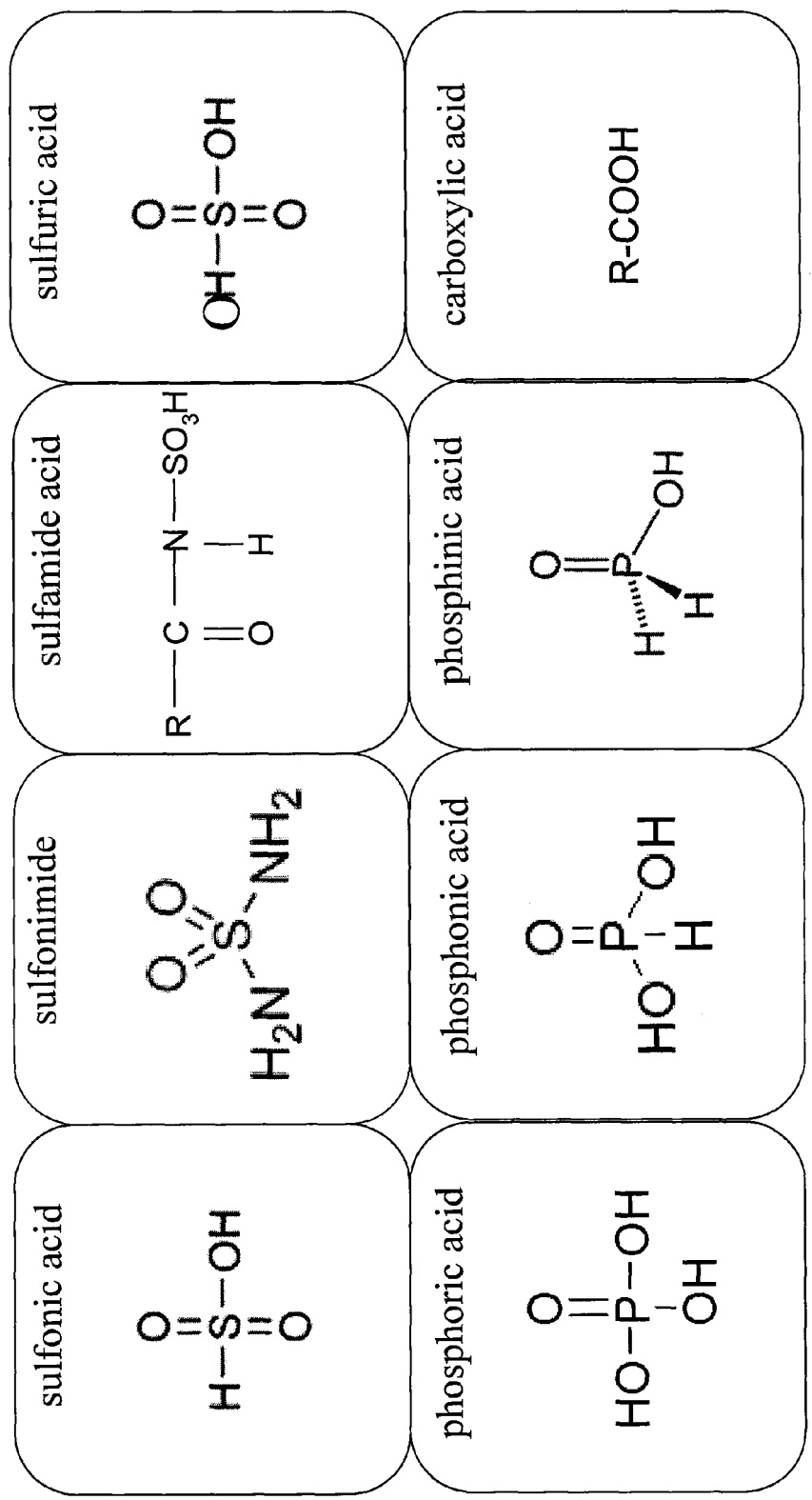
FIG. 4 illustrates proton conducting template molecules that can be used in the method depicted in FIG. 3.
Figure 5:
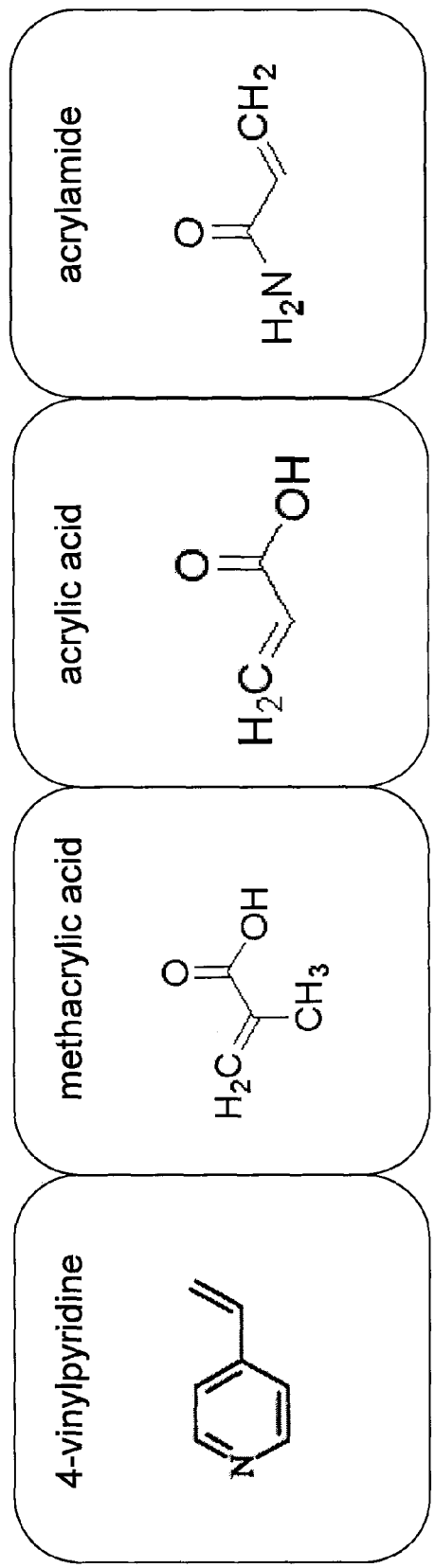
FIG. 5 illustrates functional monomers that can be used in the method depicted in FIG. 3

FIG. 4 illustrates proton conducting template molecules that can be used in the method depicted in FIG. 3. The proton conducting template molecules shown in FIG. 4 include sulfuric acid, sulfonic acid, sulfonimide, sulfamide acid, phosphoric acid, phosphonic acid, phosphinic acid, and carboxylic acid. Other proton conducting moieties may also be used for the proton conducting template molecules. The functional monomers depicted in FIG. 5 include 4-vinylpyridine, methacrylic acid, acrylic acid, and acrylamide.

Figure 6:
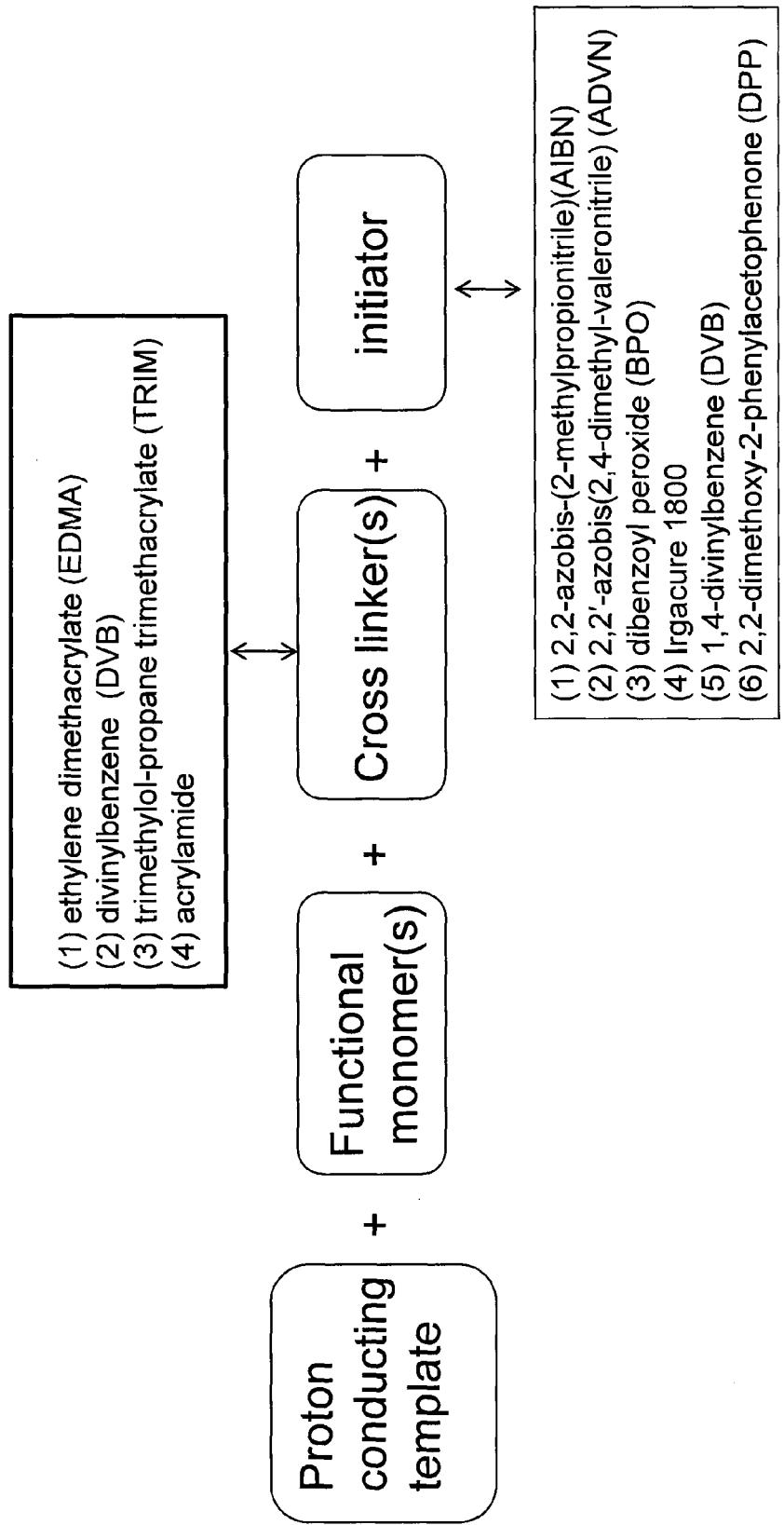
FIG. 6 shows components of an exemplary proton selective membrane that can be made in accordance with the method depicted in FIG. 3.

FIG. 6 shows components of an exemplary proton selective membrane that can be made in accordance with the method depicted in FIG. 3. Any of the previously described proton conducting template molecules shown in FIG. 4 are combined with any of the functional monomers, or any combination of the functional monomers, shown in FIG. 5. The proton conducting template molecules and the functional monomer(s) are further combined with a cross-linking agent which includes at least one of ethylene dimethacrylate (EDMA), trimethylol-propane trimethacrylate (TRIM), acrylamide and divinylbenzene (DVB), and an initiating agent which includes 2,2-azobis-(2-methylpropionitrile) (AIBN), dibenzoyl peroxide (BPO), Irgacure 1800, 1,4-divinylbenzene (DVB), 2,2-dimethoxy-2-phenylacetophenone (DPP) and 2,2'-azobis(2,4-dimethyl-valeronitrile) (ADVN). The proton conducting template molecules and the functional monomer(s) are polymerized in the presence of the cross-linking agent and the initiating agent by any number of polymerization methods including, but not limited to, thermo induced polymerization, bulk polymerization, multi-step swelling polymerization, and sonication. The resulting proton selective membrane can be used to replace existing proton exchange membranes. In addition, the ionic conductivities of the proton selective membrane are water independent thereby enabling its use at high temperatures.

Figure 7:
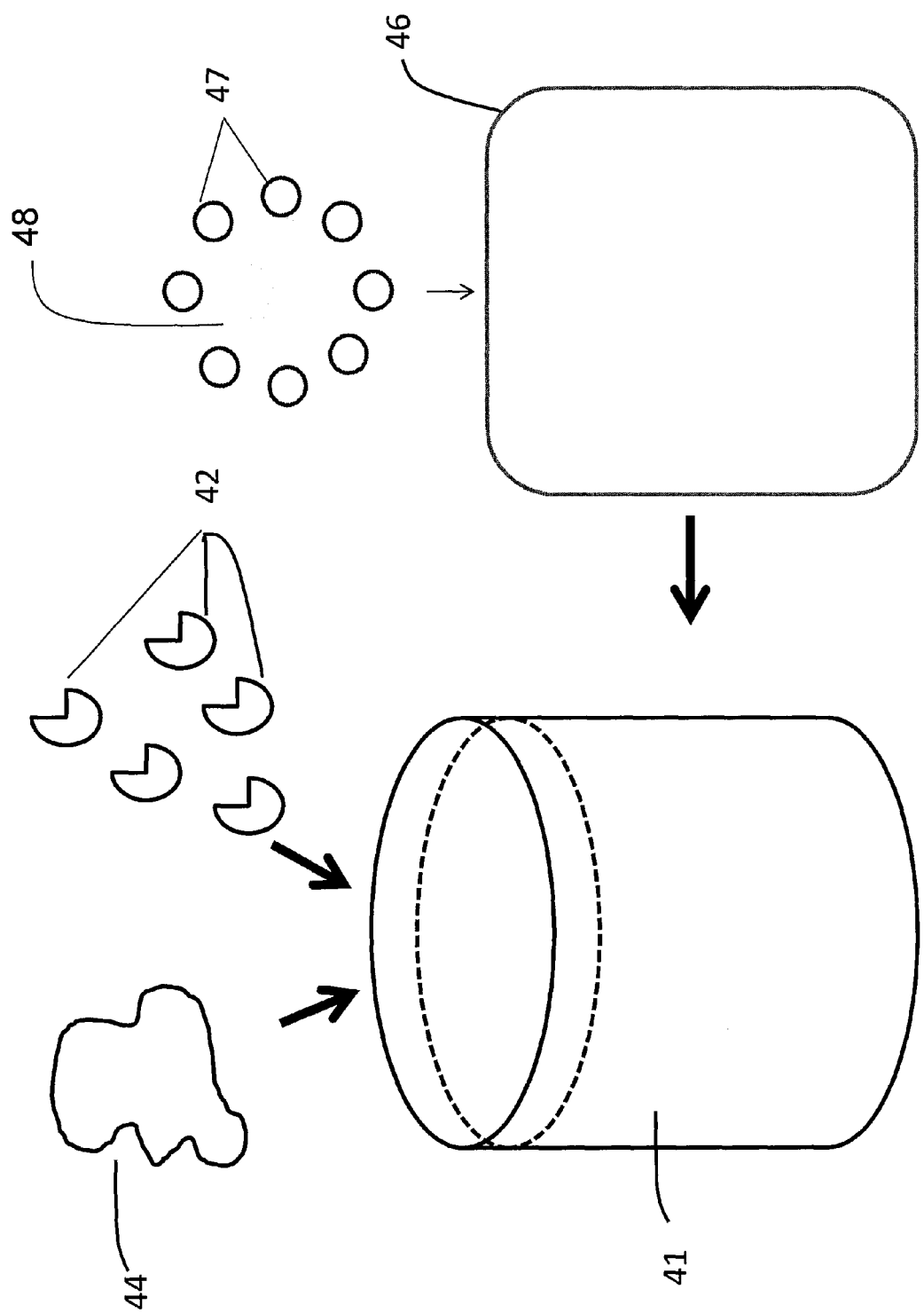
FIG. 7 is an illustration showing the components that are combined to create a proton selective membrane made in accordance with a second exemplary embodiment of the method of the present invention for making a proton selective membrane based MEA.
Figure 8:
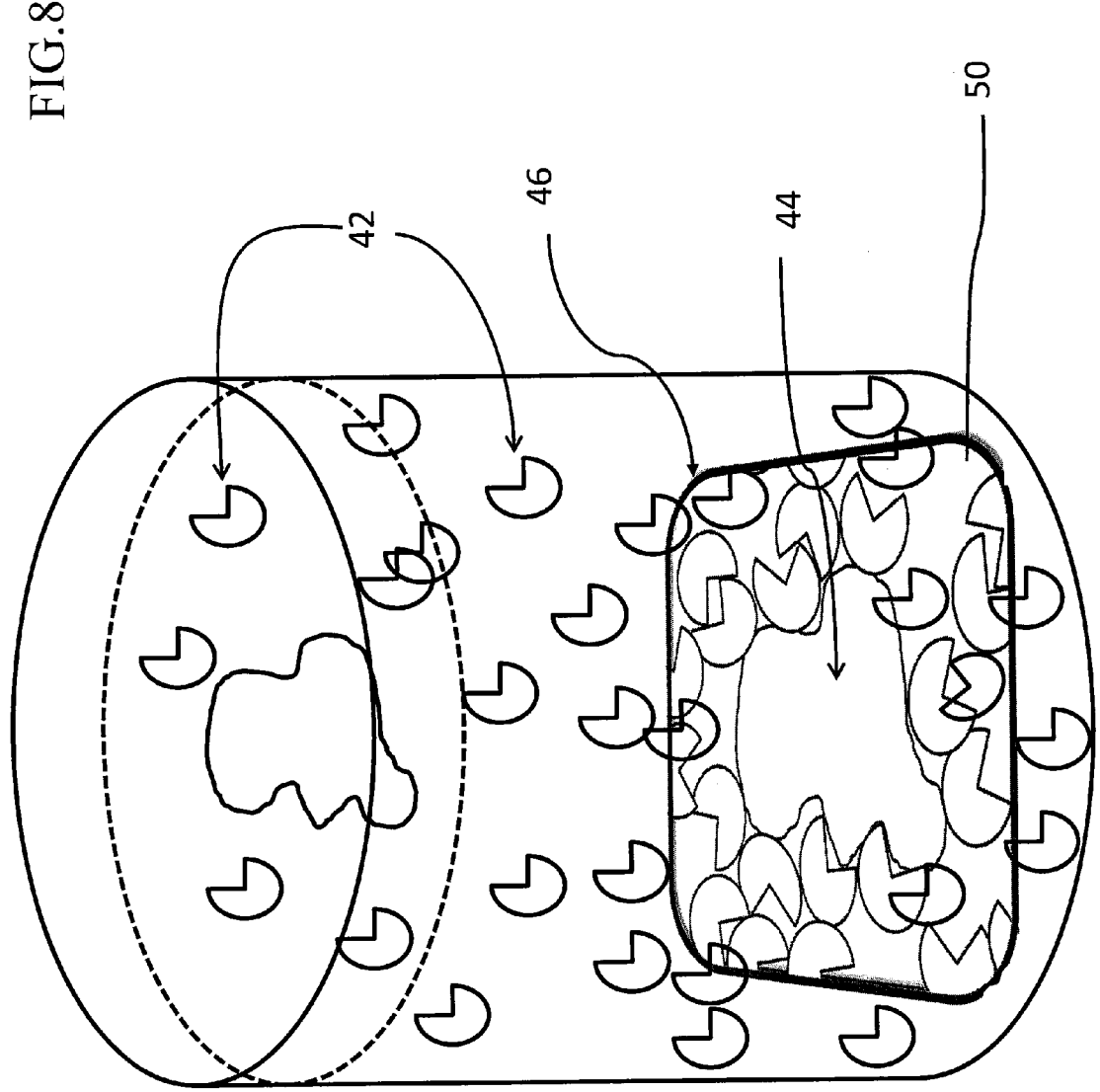
FIG. 8 is an illustration showing a matrix created by the interaction between the molecule building blocks and the surface of the electrode in the presence of a template molecule made in accordance with this second exemplary embodiment of a method for making a proton selective membrane based MEA.

FIG. 7 is an illustration showing the components that are combined to create a proton selective membrane made in accordance with a second exemplary embodiment of the method of the present invention for making a proton selective membrane based MEA. One or more solvents are combined to create a solvent solution 41. Molecule building blocks 42, one or more proton conducting template molecules 44, and a catalyst containing electrode 46 (anode, or/and cathode) having a surface capable of interacting with the molecule building blocks 42 are all added to the solvent solution 41. The electrode 46 is mostly comprised of platinum catalyst particles 47 supported on large carbon particles 48. The molecule building blocks 42, the template molecule(s) 44 and the electrode 46 can be added to the solvent 41 in any sequence depending on the imprinting system. FIG. 8 is an illustration showing a matrix 50 created by the interaction between the molecule building blocks 42 and the surface of the catalyst electrode 46 in the presence of a template molecule 44 made in accordance with the second exemplary embodiment of a method for making a proton selective membrane based MEA. The molecules should have functional groups that can react with the surface of catalyst electrode, or form a film on the surface of catalyst electrodes, by self-assembling, polymerizing, polymerizing after self-assembling, or carrying out other reactions to interact with the surface of the electrode. The molecule building blocks may include monomers, molecules, ions, polyatomic ions, salts, compounds, complexes, pure chemical elements, elemental molecules, crystals, or any other molecular component that will interact with the surface of the catalyst electrode to form a recognition matrix. The interaction between the molecule building blocks and the surface of the electrode may include covalent bonding, non-covalent bonding, hydrophobic forces, van der Waals forces, pi-pi interactions, ionic interactions, electrostatic interactions, and/or other interactions that keep the template molecule or molecules within the matrix formed within the deposition solution. The solvent or solvents used to make the deposition solution must enable the molecule building blocks to interact with the surface of the catalyst electrode to form specific recognition cavities on the surface of the electrode in the presence of the proton conducting template molecules. The molecule building blocks should be soluble in the solvent or solvents. The template molecule could be soluble or insoluble in the deposition solution. The template molecule or molecules may include sulfuric acid, sulfonic acid, sulfonimide, sulfamide acid, phosphoric acid, phosphonic acid, phosphinic acid, carboxylic acid or other proton conducting moieties.

Figure 9:
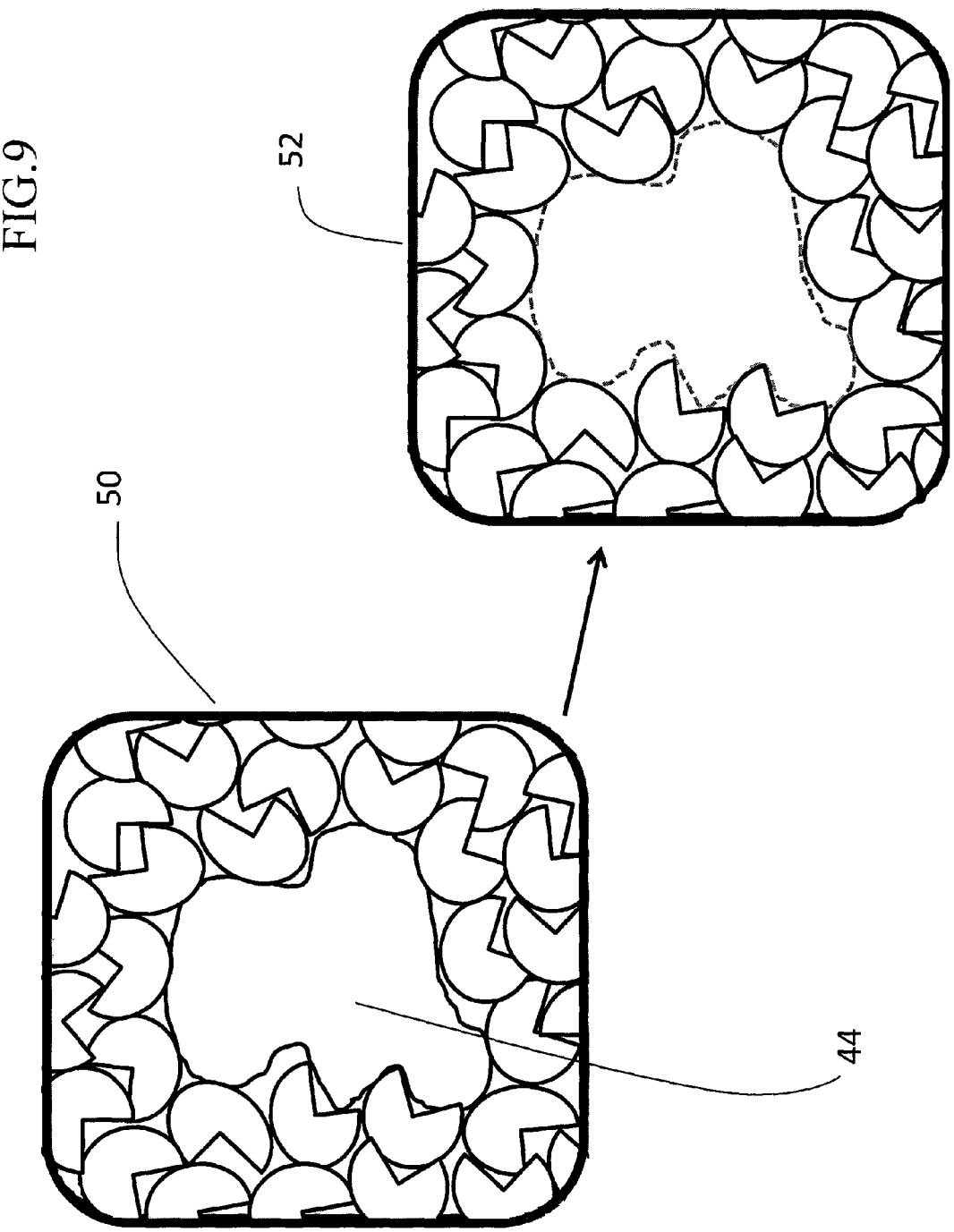
FIG. 9 is an illustration showing the rinsing of the matrix to remove the template molecule in order to create an imprinted electrode made in accordance with a second exemplary embodiment of the present invention for making a proton selective membrane based MEA.

FIG. 9 is an illustration showing the rinsing of the matrix to remove the template molecule in order to create an imprinted electrode made in accordance with a second exemplary embodiment of the present invention for making a proton selective membrane based MEA. The matrix 50 is rinsed with one or more solvents or other solutions that are able to extract the template molecules from the matrix. The template molecules are easily extracted out of the matrix to provide a proton selective membrane 52 of the present invention. A proton selective membrane based MEA is then created by putting an anode with a PSM and a cathode with a PSM together with the PSMs of the anode and cathode facing each other.

Figure 10:
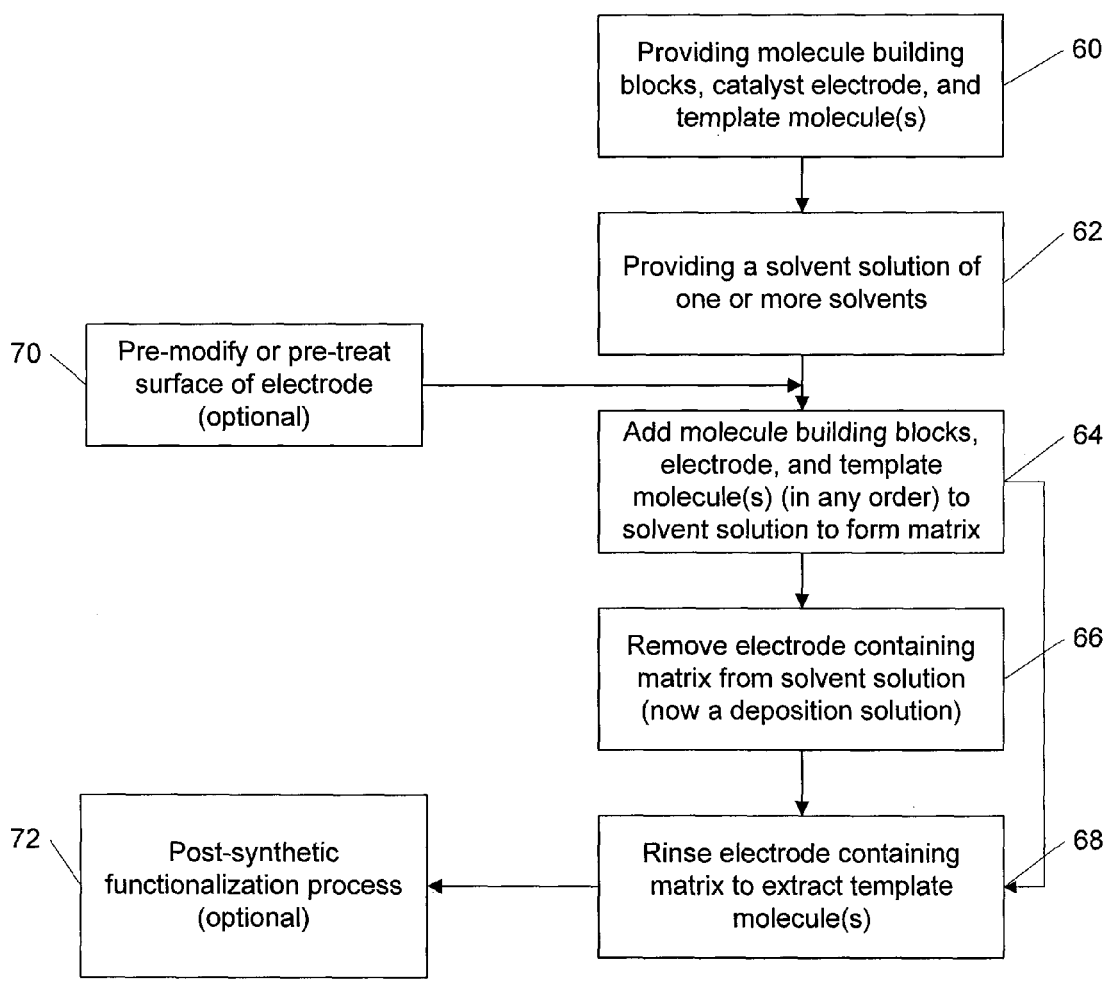
FIG. 10 is a flowchart showing the second exemplary embodiment for making the proton selective membrane based MEA of the present invention.

FIG. 10 is a flowchart showing the second exemplary embodiment for making the proton selective membrane based MEA of the present invention. First, in step 60, molecule building blocks, the catalyst electrode described above, and one or more proton conducting template molecules are provided. Next, a solvent solution of one or more solvents is provided in step 62 and the molecule building blocks, catalyst containing electrode, and template molecule(s) are added to the solution in step 64 to form a matrix. The molecule building blocks, catalyst containing electrode, and template molecule(s) can be added to the solvent solution in any order or sequence depending on the purpose or type of imprinting system. Next, in step 66, the electrode containing the matrix is removed from the solvent solution which has since become a deposition solution. Finally, the electrode containing the matrix is rinsed in step 68 to extract the template molecule(s).

The method for making the proton selective membrane 52 of the present invention shown in FIG. 10 may also further include the step of pre-modifying or pre-treating the surface of the catalyst electrode (which is preferably comprises carbon) with one or more specific functional groups that interact with the molecule building blocks (step 70). In addition, the method shown in FIG. 10 may also further include the step of carrying out a post-synthetic functionalization process to increase the affinity and/or selectivity of the imprinted electrode for protons and/or proton conducting ability after exposing the imprinted electrode (step 72).

The present invention has been described above with reference to various exemplary embodiments. However, those skilled in the art will recognize that changes and modifications may be made to the exemplary embodiments without departing from the scope of the present invention. For example, the various steps, as well as the components for carrying out the steps, may be implemented in alternate ways depending on a particular application. These and other changes or modifications are intended to be included within the scope of the present invention, as set forth in the following claims.

The invention claimed is:

1. A proton selective membrane for functioning as an electrolyte in a solid polymer electrolyte fuel cell that is produced by providing one or more proton conducting template molecules selected from the group consisting of phosphoric acid, phosphonic acid, and phosphinic acid, providing one or more functional monomers selected from the group consisting of 4-vinylpyridine, acrylic acid, and acrylamide to interact with the proton conducting template molecules, and providing at least one cross-linking agent to covalently bond polymer chains created with the proton conducting template molecules and the functional monomers by polymerization to create an imprinted polymer which possesses ionic conductivities that are independent of water thereby enabling its use at high temperatures and which employs protonic channels to transfer protons through the imprinted polymer.

2. The proton selective membrane of claim 1 wherein an initiating agent is provided to start a chemical reaction which results in the imprinted polymer.

3. The proton selective membrane of claim 1 wherein the proton conducting template molecules are removed from the imprinted polymer.

4. The proton selective membrane of claim 1 wherein the crosslinking agent is selected from the group consisting of ethylene dimethacrylate (EDMA), trimethylol-propane trimethacrylate (TRIM), acrylamide and divinylbenzene (DVB).

5. The proton selective membrane of claim 2 wherein the initiating agent is selected from the group consisting of 2,2-azobis-(2-methylpropionitrile) (AIBN), dibenzoyl peroxide (BPO), Irgacure 1800, 1,4-divinylbenzene (DVB), 2,2-dimethoxy-2-phenylacetophenone (DPP) and 2,2'-azobis(2,4-dimethyl-valeronitrile) (ADVN).

* * * * *